(12) United States Patent
Joseph et al.

(10) Patent No.: US 10,893,312 B2
(45) Date of Patent: Jan. 12, 2021

(54) DIGITAL CONTENT PROVISION

(71) Applicant: BRITISH TELECOMMUNICATIONS PUBLIC LIMITED COMPANY, London (GB)

(72) Inventors: Daniel Joseph, London (GB); Nikolay Mehandjiev, London (GB); Charalampos Theodoulidis, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/739,340

(22) PCT Filed: Jun. 23, 2016

(86) PCT No.: PCT/EP2016/064598
§ 371 (c)(1),
(2) Date: Dec. 22, 2017

(87) PCT Pub. No.: WO2016/207308
PCT Pub. Date: Dec. 29, 2016

(65) Prior Publication Data
US 2018/0199084 A1 Jul. 12, 2018

(30) Foreign Application Priority Data

Jun. 26, 2015 (EP) .................................... 15275164

(51) Int. Cl.
*H04N 21/25* (2011.01)
*H04N 21/472* (2011.01)
*H04N 21/482* (2011.01)

(52) U.S. Cl.
CPC ..... *H04N 21/252* (2013.01); *H04N 21/47202* (2013.01); *H04N 21/4826* (2013.01)

(58) Field of Classification Search
CPC .......... H04N 21/252; H04N 21/47202; H04N 21/4826
See application file for complete search history.

(56) References Cited

U.S. PATENT DOCUMENTS 6,092,049 A * 7/2000 Chislenko ............ H04N 21/252
705/7.29
9,948,998 B1 * 4/2018 Cowan ............... H04N 21/8545
(Continued)

FOREIGN PATENT DOCUMENTS

| EP | 2 207 348 | 7/2010 |
|----|-----------|--------|
| EP | 2 701 111 | 2/2014 |

(Continued)

OTHER PUBLICATIONS

Patrick du Boucher-Ryan, Derek Bridge, "Collaborative Recommending using Formal Concept Analysis", Knowledge-Based Systems, vol. 19, Issue 5, 2006, pp. 309-315, ISSN 0950-7051, (http://www.sciencedirect.com/science/article/pii/S0950705106000074) (Year: 2006).*

(Continued)

*Primary Examiner* — Randy A Flynn
(74) *Attorney, Agent, or Firm* — Nixon & Vanderhye P.C.

(57) ABSTRACT

A collaborative recommender system which is based on an application of Formal Concept Analysis is disclosed. A problem with collaborative recommender systems based on Formal Concept Analysis is that the size of the concept lattices generated can be very large. Large lattices both take a great deal of time to generate, and tend to include extraneous concepts. In the collaborative recommender systems disclosed herein the size of the concept lattices used are only of a scale required to capture the tastes of an individual user. This reduces the computational resource required by the recommender system markedly. Further improvements are obtained in some embodiments by selecting only rel- (Continued)

evant concepts from the concept lattice before building a user profile from the selected concepts. Yet further improvements are obtained by the introduction of a relevance measure which depends upon the difference between the size of the extent of the concept whose relevance is being measured and the size of the largest lower neighbour of the concept whose relevance is being measured. This relevance measure can be computed more easily than prior relevance measures.

11 Claims, 16 Drawing Sheets

(56) References Cited

U.S. PATENT DOCUMENTS

| | | | | |
|---|---|---|---|---|
| 2007/0044122 | A1* | 2/2007 | Scholl | H04N 21/4383 725/46 |
| 2007/0106651 | A1* | 5/2007 | Isaacson | H04N 21/4394 |
| 2008/0208985 | A1* | 8/2008 | Georgis | H04N 21/4622 709/206 |
| 2009/0077220 | A1* | 3/2009 | Svendsen | H04N 21/4668 709/224 |
| 2009/0216750 | A1* | 8/2009 | Sandoval | G06F 17/30569 |
| 2010/0250341 | A1* | 9/2010 | Hauser | G06F 17/30867 707/769 |
| 2010/0281025 | A1* | 11/2010 | Tsatsou | G06F 16/335 707/733 |
| 2011/0061069 | A1 | 3/2011 | Arte et al. | |
| 2012/0005224 | A1* | 1/2012 | Ahrens | H04W 4/21 707/769 |
| 2012/0265816 | A1* | 10/2012 | Picault | H04N 21/466 709/204 |
| 2013/0218905 | A1* | 8/2013 | Sankarasubramaniam | H04N 21/4661 707/748 |
| 2013/0343598 | A1* | 12/2013 | Kocks | H04N 21/8405 382/100 |

FOREIGN PATENT DOCUMENTS

| | | |
|---|---|---|
| WO | 2012/162873 A1 | 12/2012 |
| WO | 2013/144552 A1 | 10/2013 |

OTHER PUBLICATIONS

International Search Report of PCT/EP2016/064598, dated Aug. 3, 2016, 4 pages.
Gerd Stumme, Rafik Taouil, Yves Bastide, Nicolas Pasquier, Lotfi Lakhal. Computing iceberg concept lattices with Titanic. Data and Knowledge Engineering, Elsevier, 2002, 42 (2), pp. 189-222. ff10. 1016/S0169-023X(02)00057-5ff.ffhal-00578830f (35 pgs.).
Joana Trajkova and Susan Gauch. 2004. Improving ontology-based user profiles. In Coupling approaches, coupling media and coupling languages for information retrieval (RIAO '04). Le Centre De Hautes Etudes Internationales D'Informatique Documentaire, Paris, FRA, 380-390. (11 pgs.).
Klimushkin, Mikhail & Obiedkov, Sergei & Roth, Camille. (2010). Approaches to the Selection of Relevant Concepts in the Case of Noisy Data. 255-266. 10.1007/978-3-642-11928-6 18. (13 pgs.).
Patrick du Boucher-Ryan, Derek Bridge, Collaborative Recommending using Formal Concepts Analysis, Knowledge-Based Systems, vol. 19, Issue 5, 2006, pp. 309-315, ISSN 0950-7051, https:// doi.org/10.1016/j.knosys.2005.11.017. (http://www.sciencedirect. com/science/article/pii/S0950705106000074) (7 pgs.).
R. Meza and R. A. Buchmann, "Real-time social networking profile information semantization using pipes and FCA," 2010 IEEE International Conference on Automation, Quality and Testing, Robotics (AQTR), Cluj-Napoca, 2010, pp. 1-5. doi: 10.1109/AQTR.2010. 5520734 (5 pgs.).
Roth C., Obiedkov S., Kourie D. (2008) Towards Concise Representation for Taxonomies of Epistemic Communities. In: Yahia S.B., Nguifo E.M., Belohlavek R. (eds) Concept Lattices and Their Applications. CLA 2006. Lecture Notes in Computer Science, vol. 4923. Springer, Berlin, Heidelberg (14 pgs.).
S. Narayanaswamy and R. Bhatnagar, "A Lattice-Based Model for Recommender Systems," 2008 20th IEEE International Conference on Tools with Artificial Intelligence, Dayton, OH, 2008, pp. 349- 356. doi: 10.1109/ICTAI.2008.64 (8 pgs.).
The Netflix Tech Blog, "'More Like This' . . . Building a Network of Similarity", Apr. 18, 2011 (3 pgs.).
The Netflix Tech Blog, Netflix Recommendations: Beyond the 5 Stars (Part 1), Apr. 6, 2012 (4 pgs.).
The Netflix Tech Blog, Netflix Recommendations: Beyond the Five Stars (Part 2), Jun. 20, 2012 (5 pgs.).
Zhang Yun and Feng Boqin, "Tag-based User Modeling using Formal Concept Analysis," 2008 8th IEEE International Conference on Computer and Information Technology, Sydney, NSW, 2008, pp. 485-490. doi: 10.1109/CIT.2008.4594723 (6 pgs.).

* cited by examiner

| Genre / Film | Drama | Action | Crime | Adventure | Animation | Western | Romance |
|---|---|---|---|---|---|---|---|
| A |  | X |  |  |  |  |  |
| B | X | X | X | X |  |  |  |
| C | X | X |  |  |  |  |  |
| D | X | X |  |  |  |  |  |
| E | X |  | X | X |  |  |  |
| F | X |  | X | X |  |  |  |
| G |  |  | X | X | X |  |  |
| H |  |  | X | X | X |  |  |
| I |  |  | X |  |  |  |  |
| J |  |  | X | X | X |  | X |
| K |  | X | X | X |  | X |  |

Figure 4

| Concept No. | Extent | Intent | Lower Neighbours |
|---|---|---|---|
| 1 | {A,B,C,D,E,F,G,H,I,J,K} | {} | 2, 3, 4 |
| 2 | {B,C,D,E,F} | {drama} | 6, 7 |
| 3 | {A,B,C,D,K} | {action} | 6, 8 |
| 4 | {B,E,F,G,H,I,J,K} | {crime} | 5 |
| 5 | {B,E,F,G,H,J,K} | {crime, adventure} | 7, 8, 9 |
| 6 | {B,C,D} | {drama, action} | 10 |
| 7 | {B,E,F} | {drama, crime, adventure} | 10 |
| 8 | {B,K} | {action, crime, adventure} | 10, 11 |
| 9 | {G,H,J} | {crime, adventure, animation} | 12 |
| 10 | {B} | {drama, action, crime, adventure} | 13 |
| 11 | {K} | {action, crime, adventure, western} | 13 |
| 12 | {J} | {crime, adventure, animation, romance} | 13 |
| 13 | {} | {drama,act,crime,adv,ani,western,rom} | - |

Figure 5

| Node ID | Extent | Intent | Size of Extent | Collapse Index |
|---|---|---|---|---|
| 1 | {A,B,C,D,E,F,G,H,I,J,K} | {} | 11 | 3/11 |
| 2 | {B,C,D,E,F} | {drama} | 5 | 2/11 |
| 3 | {A,B,C,D,K} | {action} | 5 | 2/11 |
| 4 | {B,E,F,G,H,I,J,K} | {crime} | 8 | 1/11 |
| 5 | {B,E,F,G,H,J,K} | {crime, adventure} | 7 | 4/11 |
| 6 | {B,C,D} | {drama, action} | 3 | 1/11 |
| 7 | {B,E,F} | {drama, adventure} | 3 | 2/11 |
| 8 | {B,K} | {action, crime, adventure} | 2 | 1/11 |
| 9 | {G,H,J} | {crime, adventure, animation} | 3 | 2/11 |
| 10 | {B} | {drama, crime, adventure} | 1 | 1/11 |
| 11 | {K} | {action, crime, adventure, western} | 1 | 1/11 |
| 12 | {J} | {crime, adventure, animation, romance} | 1 | 1/11 |
| 13 | {} | {drama,act,crime,adv,ani,western,rom} | 0 | 0 |

Figure 10

| User ID | | | | | |
|---------|---|---|---|---|---|
| {B,C,D,E,F} | {drama} | | | | |
| {A,B,C,D,K} | {action} | | | | |
| {B,E,F,G,H,J,K} | {crime, adventure} | | | | |
| {B,E,F} | {drama, adventure} | | | | |
| {G,H,J} | {crime, adventure, animation} | | | | |

Figure 11

| User A | |
|---|---|
| {Batman, Man of Steel, Inception} | {action} |
| {Batman, Man of Steel} | {action, fantasy} |
| {Man of Steel} | {action, fantasy, adventure} |
| {Man of Steel, Inception} | {action, adventure} |
| {Inception} | {action, adventure, mystery} |
| {Godfather, Shawshank Redemption} | {crime, drama} |

Figure 13A

| User B | | |
|---|---|---|
| {Batman, Batman Begins, Superman, Iron Man} | {action} | |
| {Batman Begins, Superman, Iron Man} | {action, adventure} | |
| {Superman, Iron Man} | {action, adventure, sci-fi} | |
| {Godfather} | {crime, drama} | |

Figure 13B

|  | A1i | A2i | A3i | A4i | A5i | A6i |
|---|---|---|---|---|---|---|
| B1i | 1.0 | 0.33 | 0.25 | 0.5 | 0.33 | 0 |
| B2i | 0.5 | 0.33 | 0.66 | 1.0 | 0.66 | 0 |
| B3i | 0.33 | 0.25 | 0.5 | 0.66 | 0.5 | 0 |
| B4i | 0 | 0 | 0 | 0 | 0 | 1.0 |

Figure 14

DIGITAL CONTENT PROVISION

This application is the U.S. national phase of International Application No. PCT/EP2016/064598 filed Jun. 23, 2016, which designated the U.S. and claims priority to EP Patent Application No. 15275164.0 filed Jun. 26, 2015, the entire contents of each of which are hereby incorporated by reference.

BACKGROUND AND SUMMARY

The present invention relates to selecting digital content for provision via a communication network to a user. It has particular utility in video on demand systems.

Recommendation systems are often provided as part of a user's interface with video on demand systems. Some known recommendation systems are collaborative recommender systems, which identify users with similar tastes to the target user, and then recommend digital content which those other similar users have rated highly.

An important component of such algorithms is the identification of similar users. Large video on demand systems can serve tens of millions of users, and have access to billions of individual content ratings. Identifying similar users and predicting ratings for a given set of target items for a target user then becomes a problem requiring a great deal of computational resource.

Classification of users into groups can reduce the complexity of the problem—by identifying a group of users to which the current user belongs, films which the user has not yet seen but which are popular with members of that group can be identified and recommended to a user. An example of this approach is seen in US patent application US 2011/0061069 which generates clusters of users based on clustering the attributes of films or televisions programs which they have watched (their viewing history being collected by the set-top box in their home).

One method of categorization known as Formal Concept Analysis, aims at grouping objects described by common attributes. Formal Concept Analysis (FCA) constructs a concept hierarchy of a group of objects, based on subsets of objects having shared attribute sets. The core FCA definitions are outlined below.

Definition 1. (Formal Context) A formal context is a set of the binary relationships between the set of objects and the attributes they individually possess.

Definition 2. (Formal Concept) A formal concept is a pair (A, B). The set of objects A is referred as the extent of the formal concept whereas the set of attributes B is referred to as the intent.

Definition 3. (Subconcept and superconcept) A partial order relation, $\leq$, for context K may exist between a pair of formal concepts and is described by subset relation between their extents or a superset relation between their intents.

Essentially $(A_1,B_1) \leq (A_2,B_2)$ if all objects of $A_1$ are found within the set $A_2$ or if all attributes of the set $B_2$ are within the set $B_1$. $(A_1,B_1)$ would be a subconcept of $(A_2,B_2)$ whereas $(A_2,B_2)$ is described as a superconcept of $(A_1,B_1)$.

Definition 4. (Upper and lower neighbour) If $(C,D) \leq (A,B)$ and there exist no (E, F) such that $(C,D) \leq (E, F) \leq (A,B)$ then (C,D) is a lower neighbour of (A,B) and (A,B) is an upper neighbour of (C,D).

Definition 5. (Concept lattice) Alongside a unique greatest common subconcept (infimum) of the set of all formal concepts in K, and a unique least common superconcept (supremum) of that same set, the partial order relation between all formal concepts of formal context K can be displayed as line diagram or lattice. $L(K)=(K, \leq)$ is the concept lattice of the formal context (G,M, I) where G and M are sets and I is a subset of the cross product of G and M.

The binary relations of a formal context $K:=(G, M, I)$ may be represented in the form of a table where the rows represent the objects, the columns the attributes, and an X in the cell representing the existence of a binary relation between the corresponding attribute and object.

Concept lattices have been proposed as a suitable way of organising information about users and the films they have watched or rated. The paper 'Collaborative Recommending using Formal Concept Analysis' by Patrick du Boucher-Ryan, and Derek Bridge presented in Knowledge-Based Systems, Volume 19, Issue 5, September 2006, at pages 309-315, takes a matrix of users and the films they have rated (each element of the matrix being the rating the user has given to that film), reduces that matrix to a binary relation (a formal context) between the users and the films they have watched, and generates a concept lattice from that binary relation. Each concept in the concept lattice includes a set of users, and the set of films which those users have rated. The structure of the concept lattice is then used to limit the number of users which are considered when finding those users most similar to the target user.

However, the size of a concept lattice is exponential in the number of users and films in the binary relation from which it is constructed. This would render concept lattices unsuitable for use in recommendation systems, in the absence of techniques which reduce the size of the concept lattice (there is of course, always the option of reducing the pool of users from which the concept lattice is generated, but this is likely to result in less accurate predictions as to whether a user will enjoy a content item).

According to a first aspect of the present invention, there is provided a method of generating recommendations of digital content items for a target user of a digital content item provision system, said method comprising:
generating, for each of a plurality of users of the digital content item provision system, a user profile from a concept hierarchy representing digital content items selected by the user;
comparing said user profiles to identify similar users; and
sending to said target user, recommendations of one or more digital content items based on digital content items selected by similar users to said target user.

By generating user profiles for a plurality of users of a digital item content provision system, each user profile being derived from a concept lattice built to categorise digital content items selected by the user, comparing said user profiles to identify similar users; and sending to a target user, recommendations of one or more digital content items based on digital content items selected by similar users to said target user, a method of generating recommendations for a target user is provided in which only as many digital content items as are found in a binary relation which captures the tastes of a single user are included in each concept lattice used to generate the user profile. As a consequence, the size of the concept lattices involved are massively reduced in comparison to prior-art approaches, and the computational efficiency of the recommendation method exceeds what has been achieved before.

In some embodiments, said user profile generation comprises:
calculating a relevancy measure for each of one or more concepts in said concept hierarchy representing digital content items selected by the user; and selecting relevant concepts on the basis of said relevancy measures.

This has the benefit of removing extraneous concepts from the user profile, and thus simplifying the subsequent identification of similar users.

Methods of using relevancy measures to remove extraneous concepts from concept lattices are known. One approach is simply to only include concepts which contain greater than a given percentage of the objects in the overall formal context. This is seen, for example, in 'Computing Iceberg Concept Lattices with Titanic' by Gerd Stumme et al published in Data and Knowledge Engineering, Elsevier, 2002, 42(2), pp. 189-222.

Alternative indices for concept selection are suggested in 'Approaches to the Selection of Relevant Concepts in the Case of Noisy Data', by Mikhail Klimushkin et al, pp 255-266 of vol. 5986 of Lecture Notes in Computer Science, Springer, 2010. In particular, an intensional stability index is described which defines the intensional stability index of a concept (A,B) as the ratio between the number of sub-contexts of the formal context where B is an intent, to the total number of sub-contexts of the formal context. An algorithm for calculating that ratio is disclosed in 'Towards Concise Representation for Taxonomies of Epistemic Communities', Camille Roth, Sergei Obiedkov, and Derrick Kourie 2006 in Proceedings of the 4th international conference on Concept lattices and their applications (CLA'06), Sadok Ben Yahia, Engelbert Mephu Nguifo, and Radim Belohlavek (Eds.). Springer-Verlag, Berlin, Heidelberg, 240-255. Whilst this index can give concepts lower in the lattice higher stability values than concepts above them, it is computationally burdensome.

In some embodiments, said relevancy measure depends upon the number of digital content items found in the concept but not in the largest of the one or more concepts which are lower neighbours of the concept in said concept lattice.

This provides a relevancy measure which, like the intensional stability index, captures concepts lower in the hierarchy which might nevertheless be important in describing the nature of digital content items selected by the user, but which requires less computing resource than is required to calculate the intensional stability index of each concept.

In some embodiments, the method further comprises delivering all or part of said content items to the target user in advance of the user making a request for the content item. By using the one or more recommendations of digital content items as a prediction of digital content which the user is likely to consume in the future, and downloading some or all of those digital content items to the users set top box, television or other storage facility located in the user's premises, the user can view the digital content items without fear of the live delivery of those digital content items being disrupted by the advent of a poor or congested communications path over the access network to the source of the digital content item.

In some embodiments, said calculation of said relevancy measure further comprises dividing said number by the number of digital content items represented in the user profile. This is useful in embodiments where there is a need to provide a common criterion for the selection of relevant concepts from a plurality of concept lattices.

According to a second aspect of the present invention, there is provided recommender apparatus comprising:
a user profile generator arranged in operation, for each of a plurality of users of a digital content provision system, to generate a user profile from a concept lattice representing digital content items selected by the user;
a recommendation engine arranged in operation to find users in said plurality of users of said digital content system whose user profiles are similar to the user profile of the target user, and to select for recommendation to the target user, digital content items popular with said similar users but not yet provided to the target user; and
a recommendation communicator arranged in operation to send a recommendation message to said target user recommending one or more of the digital content items selected by the target user.

According to a third aspect of the present invention, there is provided a digital content storage device for consumers of digital content, said digital content storage device being arranged to receive said recommendation message from recommender message from recommender apparatus according to the second aspect of the present invention, and download some or all of said recommended content.

Examples of digital content storage devices include set-top boxes and smart televisions.

BRIEF DESCRIPTION OF THE DRAWINGS

There now follows, by way of example only, a description of one or more embodiments of the invention. This description is given with reference to the accompanying drawings, in which:

FIG. 4 shows a binary relation between a set of films watched by a user and a set of genres to which those films are indicated to belong;

FIG. 5 shows the same information organised as a concept hierarchy;

FIG. 10 shows a weighted concept lattice representing a user's viewing habits;

FIG. 11 shows a user profile generated from the weighted concept lattice of FIG. 10;

FIGS. 13A and 13B show example user profiles;

FIG. 14 shows values obtained in a user profile comparison process on comparing the example user profiles of FIGS. 13A and 13B.

DETAILED DESCRIPTION OF EXAMPLE EMBODIMENTS OF THE INVENTION

Figure 1:
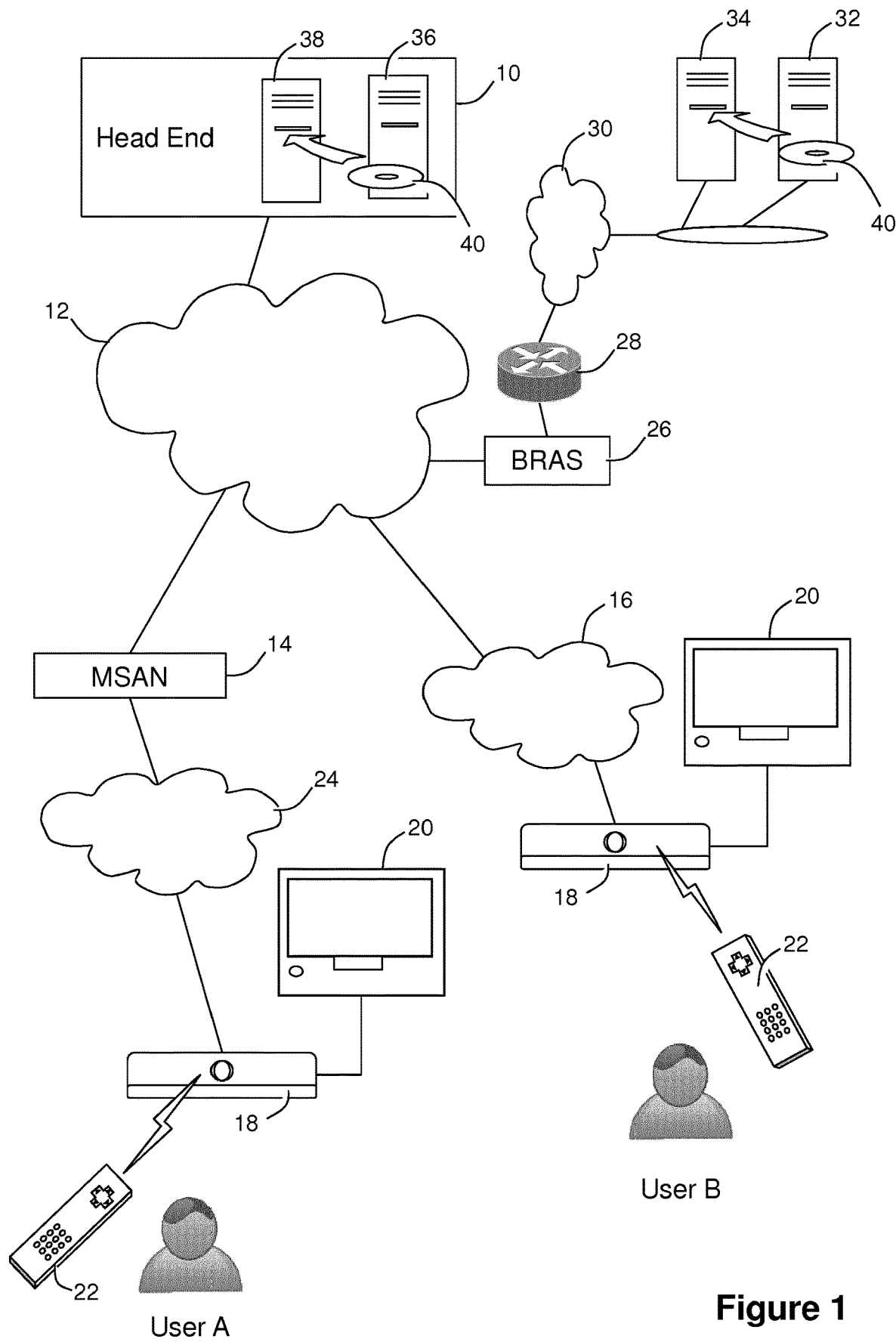
FIG. 1 shows a video-on-demand provision system.

A video-on-demand communication system (FIG. 1) comprises a head end 10 connected by a communication provider's network 12 to a multi-service access node (MSAN) 14 and a fibre access network 16. The fibre access network 16 in turn provides connection to a network termination point (not shown) in each of the customer premises connected via that fibre network, the network termination point being further connected via internal cabling and a residential gateway router (not shown) to a set top box 18. Each set top box 18 outputs a video signal to an associated television 20 and is controlled by a user using a remote control device 22. The control is via a user interface presented on the television screen which the user is able to interact with by using navigation and selection buttons on the remote control 22.

The MSAN 14 is itself connected via a copper access network 24 to other customer premises having a similar home network arrangement inside.

Also connected the service provider's network 12 is a Broadband Remote Access Server 26 which is connected via a router 28 to the Internet 30. A content provision system including an Internet television server computer 32 and a recommendation server computer 34 is connected to the Internet and is configured to deliver television content and recommendations over the Internet 30 and the communication provider's network 12 to customer premises.

The head end 10 similarly includes a video-on-demand server 36 and a recommender server computer 38.

Each of the recommender server computers 34, 38 is provided with recommendation software from CD-ROM 40. The software could, of course, instead be downloaded from a predetermined Internet address to the server computer 34, 38.

Each recommender server computer 34, 38 comprises (FIG. 2) a central processing unit 60, a volatile memory 62, a read-only memory (ROM) 64 containing a boot loader program, and writable persistent memory—in this case in the form of a hard disk 70. The processor 60 is able to communicate with each of these memories via a communications bus 66.

Also communicatively coupled to the central processing unit 60 via the communications bus 66 is a network interface card 68. The network interface card 68 provides a communications interface between the recommender server computer 34, 38 via communication links to the communication provider's network 12 or the Internet 30.

The hard disk 70 of the recommender server computer 34, 38 stores an operating system program 72, a user viewing-history collector 78, a user profile generator 80, a recommendation engine 82, and a recommendation message provider 82.

Also stored on the hard disk 70 are the user viewing histories 84 provided by the user viewing-history collector 78, the user profiles 88 derived from those user viewing histories by the user profile generator 80, and the recommendation lists for output by the recommendation engine 82.

Figure 3:
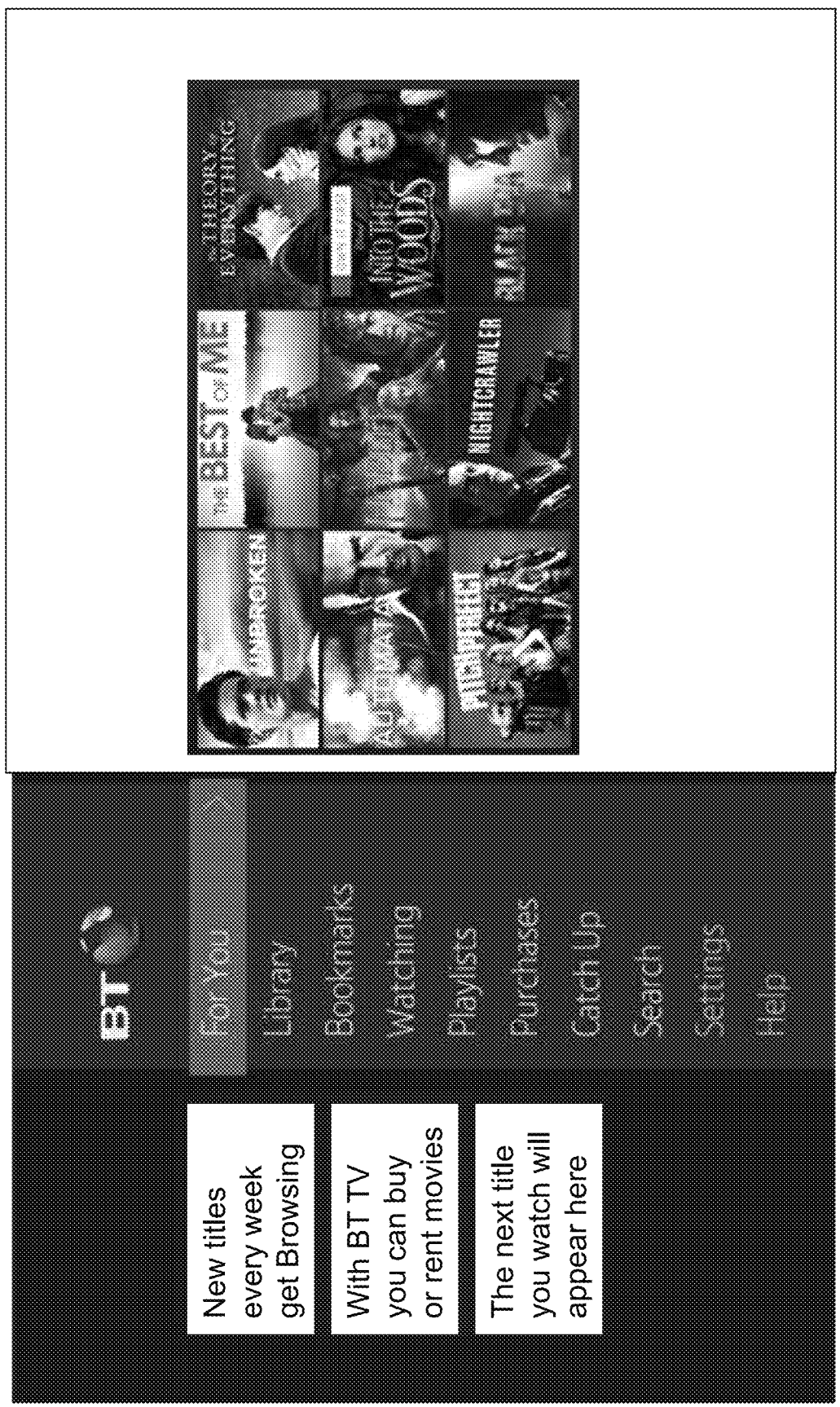
FIG. 3 shows an example of a recommendations display provided on the television screen of a user.

FIG. 3 shows a screen presented to the user showing the top film recommendations for a particular user. In this example, nine top film recommendations are presented. Picture files are provided as part of the recommendation message provided from the recommendation server computer 34, 38. In some embodiments, part or all of the recommended films are downloaded onto the memory of the user's set top box so that, should the user choose to watch one of the recommended films, then the films can be smoothly presented by the set top box even in the event of the capacity of the access network 24, 16, communication provider network 12 or Internet 30 being less than that required to stream the film directly from the head end 10 or the Internet television server computer 32.

FIG. 4 shows a table which illustrates the binary relation between a set of films a user has watched, and a set of genres to which those films belong. The genre(s) to which each film belongs might be retrieved from a database such as the Internet Movie Database, or from a database maintained by the content provider. The data in this table forms a 'context' of the type known from Formal Concept Analysis.

Formal Concept Analysis provides techniques for taking a context (FIG. 4) and constructing a concept lattice (FIG. 5). Suitable software for doing that is available from www.u-priss.org.uk/fca/fca for example. Each row in the table seen in FIG. 5 represents a concept which has two parts, firstly a list of films (the 'extent' of the concept), and secondly a list of attributes shared by each member of that list of films (the 'intent' of the concept). Adding another attribute to the intent of a first concept will lead to a second concept whose members are some or all of the films found in the first concept. For example, the films found in concept 10 ({B}) are a subset of the films found in concept 7 {B, E, F}—the set of films categorised as drama, crime, and adventure is a subset of the set of films categorised as drama and adventure.

In this embodiment, the concept hierarchy includes data indicating the subset/superset relationships between the different concepts—in particular, data indicating the one or more lower neighbours of each concept is included. However, in other embodiments, this information could be deduced when required from the extents or intents of the concepts.

Figure 6:
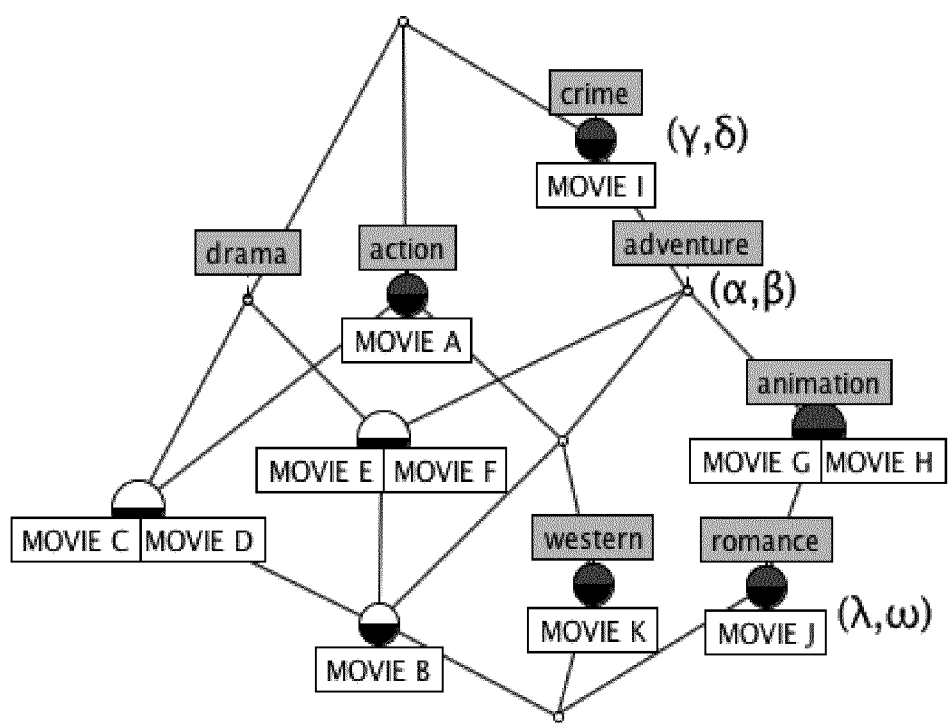
FIG. 6 is a Hasse diagram representing the concept hierarchy of FIG. 5.

This hierarchical containment relationship between concepts leads to concepts being presented as a graph where a concept whose objects are a subset of the larger set of objects of another concept is represented as a child of the concept having the larger set of objects which includes the subset. An example of such a graph (such graphs are referred to as Hasse Diagrams), for the data seen in FIGS. 4 and 5, is seen in FIG. 6. In such diagrams, each node is first labelled only with the objects which belong to that node, but not to any child node (the effect being that the objects included within a concept can be read off the graph by adding together the objects at the node in question and the objects at all the nodes descending from the node in question. Similarly, each node is also labelled with the attribute(s) which characterise that node, but not any of the predecessor nodes (the effect being that the attributes which characterise a node can be read off the graph by adding together the attributes at the node in question, and the attributes of all the nodes encountered when ascending from the node in question).

Figure 7:
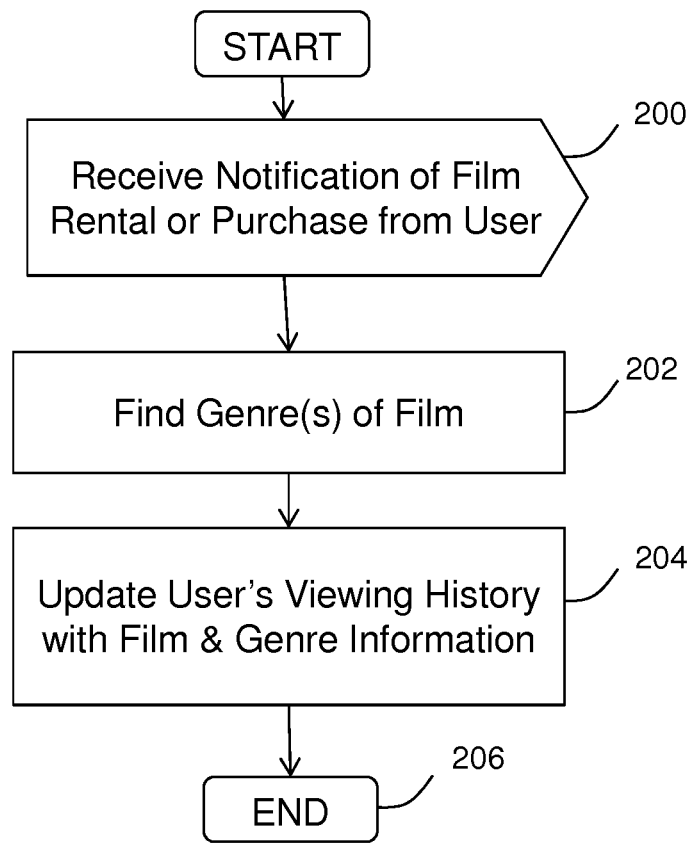
FIG. 7 shows a user viewing history updating process.

The user viewing history collector (FIG. 7) is triggered by each request for content received from a user's set top box 18. The process involves finding 202, from a movie database, the genre of the film which the user has requested, and then adding 204 the film and the genre information to the user viewing history. The process then ends 206. This adds a row to the context table (FIG. 4) for the user who made the content request which triggered the process.

Figure 2:
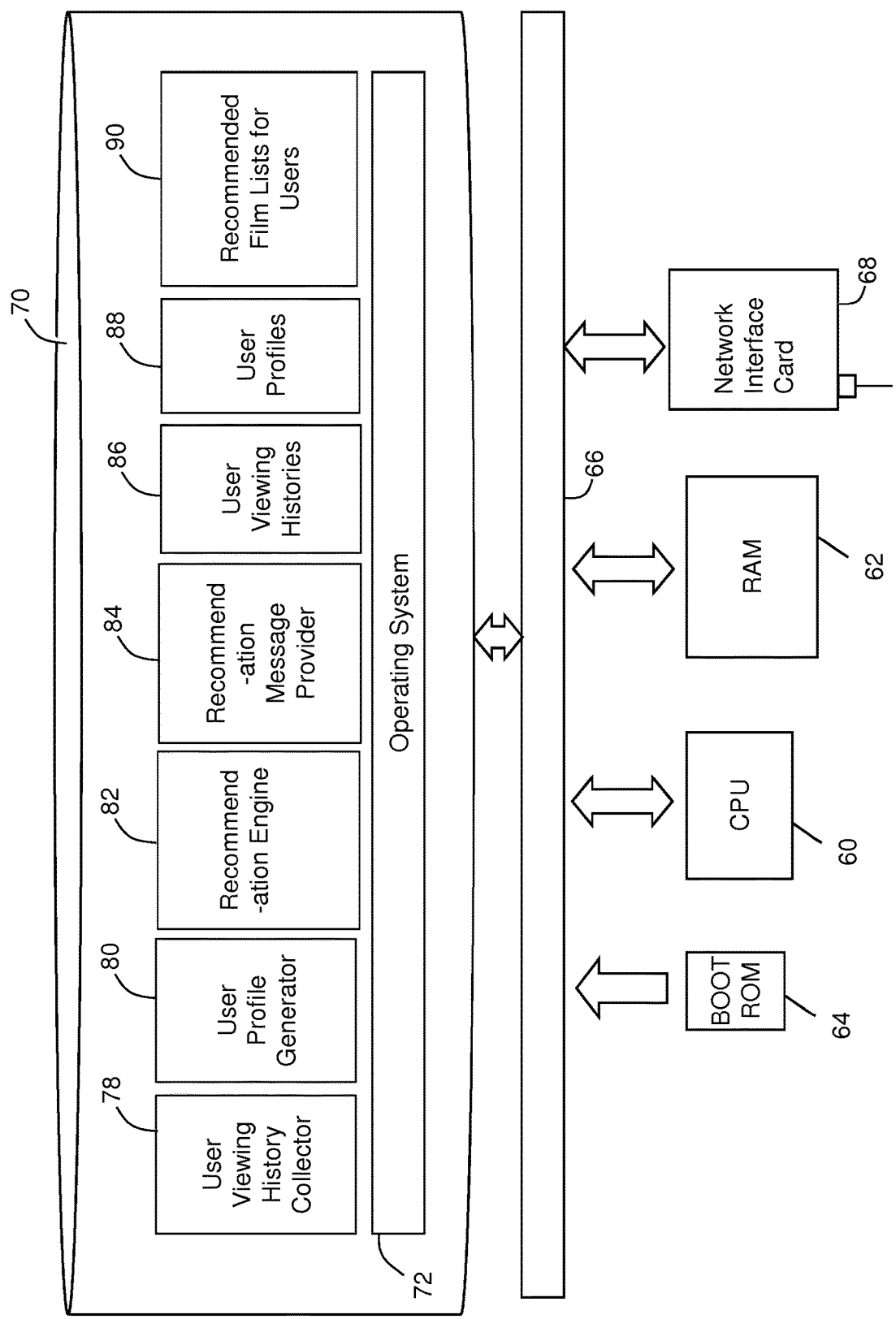
FIG. 2 shows a server computer providing a recommendation facility to users of the video-on-demand provision system.
Figure 8:
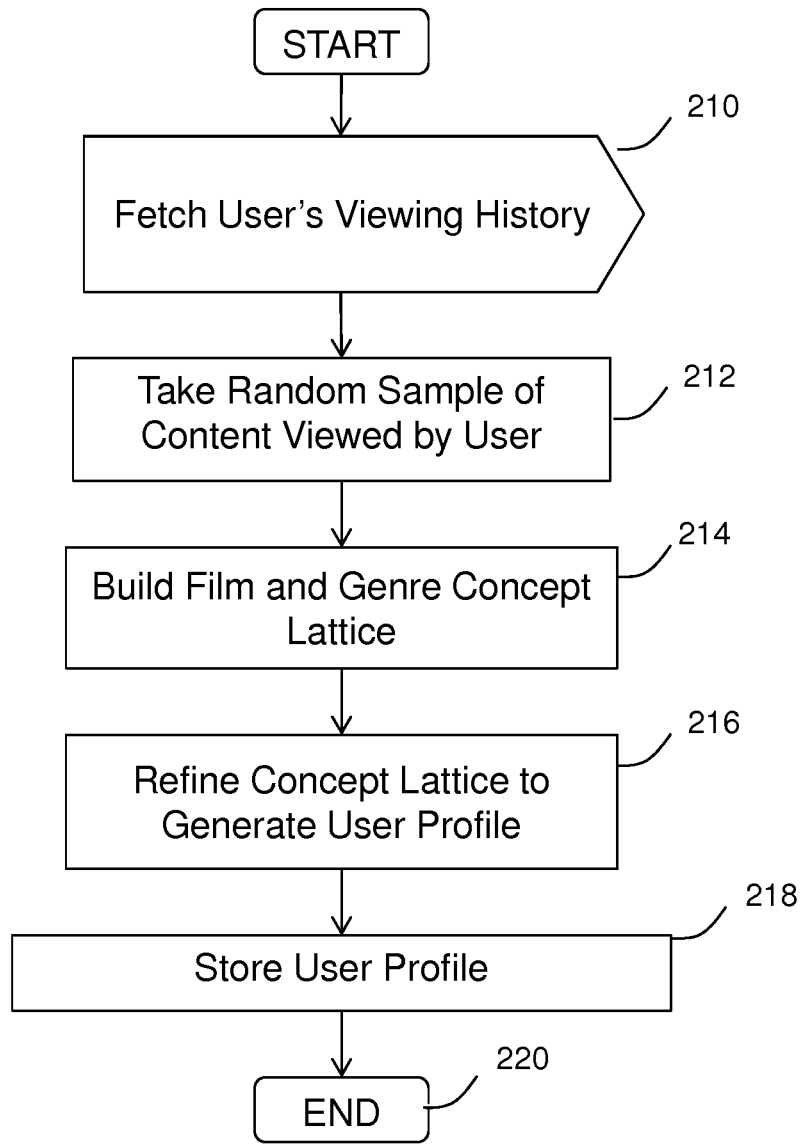
FIG. 8 shows a user profile generation process.
Figure 9:
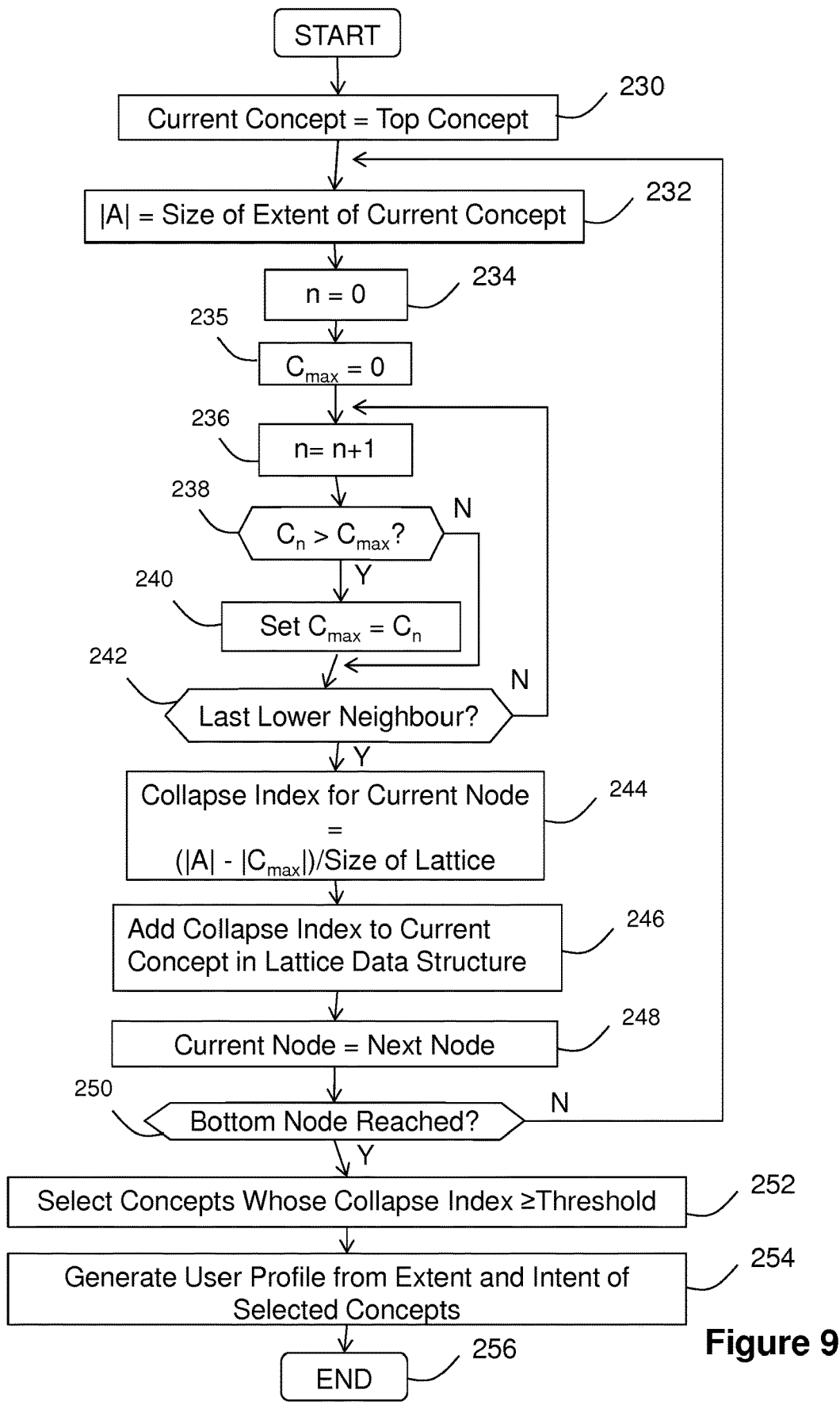
FIG. 9 shows a concept lattice refinement process used in the user profile generation process.

The user profile generator (FIG. 8) is triggered when an appropriate time period has passed or the user has viewed a certain amount of content. The process begins by fetching 210 the user's viewing history (FIG. 2, 86). A random sample of, say, thirty films viewed by the user is then taken 212, and a concept lattice (FIG. 6) is built. The concept lattice is then processed to generate 216 a user profile (a step which is discussed in detail below with reference to FIGS. 8 and 9), and the user profile (FIG. 2, 88) is stored 218. The user profile generator then ends 220.

The processing of the concept lattice to generate a user profile begins by setting 230 the current concept to the first node in the lattice data structure (FIG. 5). Thereafter, an outer set of instructions (232 to 250) is repeated for each concept in the lattice, each iteration of the outer set of instructions ending with the incrementation 248 of the current node to the next node in the concept lattice data structure (FIG. 5), and a test 250 to find whether the last node in the concept lattice has been reached. If the test 250 finds that the last node in the concept lattice has been reached, then no further iterations of the outer set of instructions are carried out. If, on the other hand, the test 250 finds that the last node of the concept lattice has not been reached, then another iteration of the outer set of instructions (232 to 250) is carried out for the current concept.

Each iteration of the outer set of instructions (232 to 248) begins by setting 234 a counter variable to zero, and setting 235 a maximum lower neighbour concept extent size to zero. An inner set of instructions (236 to 242) is then carried out for each concept which is a lower neighbour of the current concept. The inner set of instructions begins by incrementing 236 the counter variable to point to the next lower neighbour of the current concept. This is followed by a test 238 to find whether the size of the extent of the current lower neighbour concept is greater than the current value of the maximum lower neighbour concept extent size. If it is greater, then the current value of the maximum lower neighbour concept size is set 240 to the size of the extent of the current lower neighbour. A test 242 is then carried out to find whether the last of the lower neighbours of the current concept has been considered. If not, another iteration of the inner set of instructions is performed. If the last of the lower neighbours has been considered, a measure of the significance of the current concept is calculated 244. The measure, here referred to as the 'collapse index', calculates the significance of a formal concept (A,B) by determining the minimum percentage of objects which need be removed from the formal context, in order for the attribute set B to not be the intent of any formal concept generated from the newly reduced formal context. The greater percentage of objects that need be removed, the 'stronger' or more significant the formal concept. The collapse index is a measure of the relevance of the concept in a description of the films selected by the user. It can be regarded as a weight to be applied to the associated concept in subsequent processing of the concept lattice.

In mathematical terms, given the formal context K=(G, M, I), $(C_i, D_i)$ is a lower neighbour of (A, B), and $|C_1| \leq |C_2|, \leq \ldots \leq |C_n|$, the collapse index of (A, B) is $$ci(A, B) = \frac{|A| - |C_n|}{|G|} \qquad \text{Equation 1}$$

The numerator of the fraction is thus a measure of how many objects found in the extent of the concept (FIG. 5) are not found in the lower neighbour concept representing the biggest subset of the extent of the current concept. In other words, the numerator is the size of the relative complement of $C_n$ in A (those skilled in the art would be able to provide code executable to calculate the value of the numerator in that way as an alternative to using the method illustrated in FIG. 9).

The denominator of the fraction is the number of objects in the context as a whole (in this particular example, the number of films in the selection of films chosen from the user's viewing history).

Having calculated the collapse index for the current concept, the collapse index is added 246 to the lattice data structure (FIG. 5) to generate an entry in a weighted lattice data structure (FIG. 10). The current concept pointer is then moved 248 to the next concept in the concept lattice data structure (FIG. 5), and the test 250 performed.

Once the test 250 finds that all the concepts but the lowest concept (the infimum of the concept lattice) have undergone the outer set of instructions (234 to 250), any rows in the weighted concept lattice structure for which the collapse index is less than a predetermined threshold are removed 252 from the concept lattice structure. In the present example, a threshold (2/11) is chosen which leaves around half of the original rows in the concept lattice (FIG. 5). Only the extent and intent columns of the selected rows are then used to generate a user profile (FIG. 11). The user profile thus includes a plurality of rows 260, each listing a genre or genre combination 262 which is significant for the user, in association with a list 264 of the selected films which have that genre or genre combination.

Figure 12:
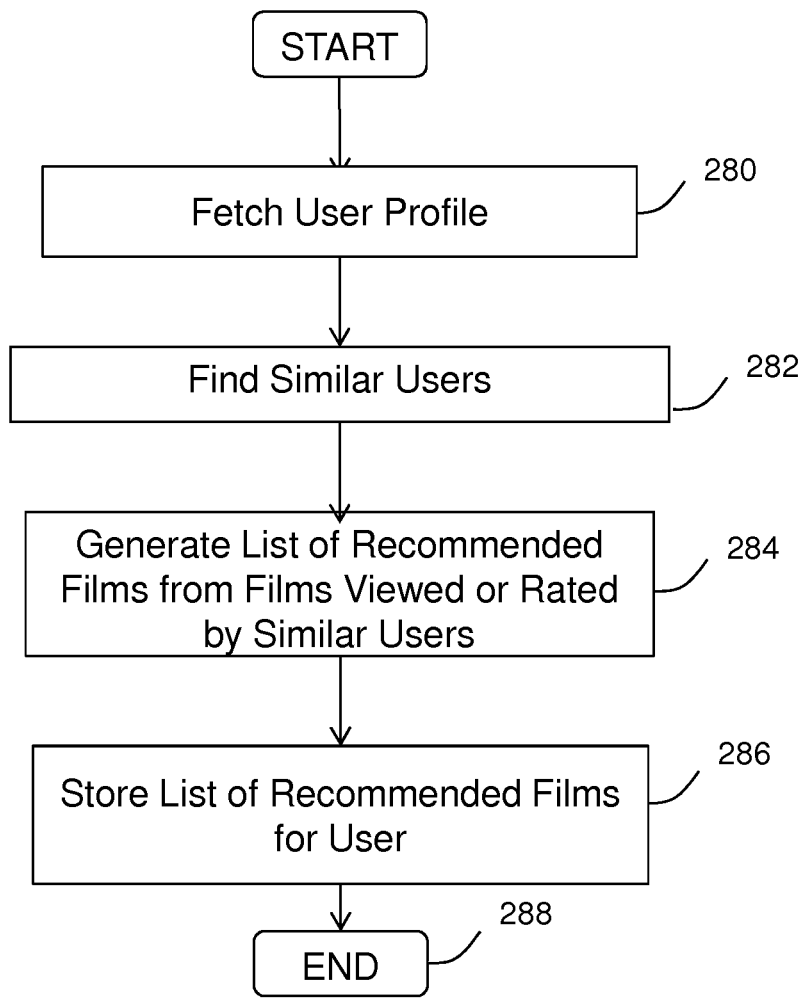
FIG. 12 shows a recommendation list generation process.

On occasion (e.g. after a predetermined time interval for each user), a recommendation list generation process (FIG. 12) fetches 280 the user's profile, and finds 282 the top-K similar users based on the application of pairwise similarity comparisons with the profiles of other users. Once the top-K similar users are found, in a similar manner to known automatic collaborative recommendation systems, the user profiles of those users are used to determine a user's interest in content the user has not previously consumed, and thereby generate a list of recommended films for the user.

A comparison of user profiles may be accomplished by assessing how similar the formal concepts in the profile of a first user (e.g. User A whose profile is seen in FIG. 13A) are to the formal concepts in the profile of a second user (e.g. User B whose profile is seen in FIG. 13B).

For each formal concept in the first profile, a similarity value is obtained between that formal concept and all formal concepts in the second profile. This formal concept comparison may be accomplished using the Jaccard coefficient on the intent of the pair of formal concepts (in other embodiments the extents might be compared instead of or in addition to a comparison of the intents). The highest similarity value found for a formal concept in the second profile is chosen as the best match for the formal concept in the first profile. This process is repeated for every formal concept in the profile of the first user. The average of the 'best matches' for the formal concepts in profile A is considered as a measure of the similarity between the first profile and the second profile.

Consider as an example the profile of User A (FIG. 13A) and the profile of User B (FIG. 13B). The intent of each formal concept in the profile of User A is compared to all formal concepts in the profile of User B.

Figure 15:
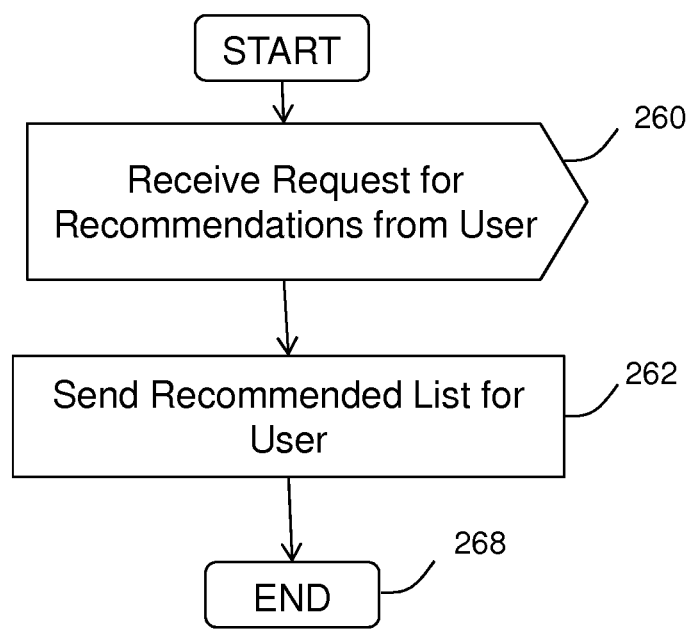
FIG. 15 shows a recommendation list provision process.

In FIG. 15, the Jaccard Coefficients for each of the cross-wise comparisons of the intents of the profile of User A and the profile of User B is shown. The maxima in each column can be seen to be 1.0, 0.33, 0.66, 1.0, 0.66 and 1. The average of the best matches is taken as the similarity between the two profiles—in this particular instance, 0.778.

By comparing a user with all other users of the video-on-demand or Internet television service, the top-K most similar users can be identified as those users whose profiles have a top-K similarity score with the user's profile.

A list of recommended films for the user is then generated 284 by giving the movies watched by those similar users a weight corresponding to the similarity measures for the similarity of those users to the current user. The top N films most commonly found in the other user profiles, but not included within the user's viewing history are then stored by the recommendation server 34, 38 in its persistent storage 70 (FIG. 2, 90). The number of films represented will vary between implementations, but a suitable number might be around 10. The recommendation list generated in this way replaces any earlier recommendation lists for this user.

As seen in FIG. 15, when the recommender server 34, 38 next receives 260 a request from the set-top box 18 seeking a recommendation list for its user, the recommendation server 34, 38 responds by sending 262 the recommended film list to the set-top box 18.

In some embodiments, the set-top box 18 then requests some or all of the content from a content server—for example from the video-on-demand server 36 or the Internet television server 32.

Possible variations on the above embodiment include (this list is by no means exhaustive):

i) the functionality of the set top box could instead be provided by a computer in the head end 10, or the Internet television content provision system or at another location outside the customer premises but within the system of FIG. 1;

ii) the functionality of the set top box could instead provided as an integral part of the television set;

iii) a recommender engine might be present in only one of the head end 10 and the Internet television content provision system. Indeed, only one of the head end 10 and the Internet television content provision system might be present in other embodiments;

iv) in the above embodiments, the films selected by a user were arranged into a concept hierarchy based on one or more genre(s) attributes. However, in other embodiments, different attributes might be used in constructing the concept lattices. For example, films might be characterised by the actors who appeared in them, or by their directors or screenwriters, or by a combination of attributes (e.g. by the key people involved in the the film). In other embodiments, transactional information gathered by the set top box (e.g. time viewed, place viewed etc) might instead be used as attributes to characterise different films;

v) whilst, in the above embodiment, the collapse index was calculated for every concept in the concept lattice, in other embodiments, it might be calculated for a subset of the concepts in the concept lattice—for example a hybrid approach might be adopted in which a first selection process selects only the concepts having an extent size which exceeds a threshold, that first selection process being followed by a selection process like that described in the above embodiment;

vi) whilst in the above embodiment, the digital content items were films, the techniques described here are applied in other embodiments to different types of digital content items—for example, music recordings, or electronic books;

vii) in the above embodiment, a user profile was generated for every user of the video-on-demand system. In other embodiments, only selected users might have user profiles generated—for example only users who opt-in or subscribe to a recommendation provision service might have user profiles generated for them;

viii) in the above embodiment, the similarity between user profiles was calculated using a 'best match' approach. In other embodiments, the similarity between the concepts in the two user profiles might be calculated using a cosine similarity measure, in some cases with each inter-concept similarity being weighted by one or both of the collapse indices for the two concepts;

ix) the similarity measure used in the above embodiment is asymmetric—it depends upon whether the greatest element of each row or each column in FIG. 14 is used. In other embodiments, both 'best match' similarity measures could be found, and the average or sum of the two taken to be the overall similarity measure between the two concepts.

x) whilst in the above embodiment, the collection of the viewing history, the generation of a user profile, the generation of recommendations, and the transmission of a message communicating those recommendations to a user was achieved by the execution of software instructions on a general purpose processor, in other embodiments one or more of those functions might be provided by special purpose digital electronic hardware, in some cases including programmable logic devices, or application-specific integrated circuits;

xi) in the above embodiment, the mere fact that a user had seen, heard or read a digital content item was taken as an indication that the user would recommend the digital content items to others. However, in other embodiments, users would be able to give digital content items a rating, and only digital content items which the users gave a high rating (e.g. higher than a threshold) would be included in the formal context.

In summary of the above disclosure, a collaborative recommender system which is based on an application of Formal Concept Analysis is disclosed. A problem with collaborative recommender systems based on Formal Concept Analysis is that the size of the concept lattices generated can be very large. Large lattices both take a great deal of time to generate, and tend to include extraneous concepts. In the collaborative recommender systems disclosed herein the size of the concept lattices used are only of a scale required to capture the tastes of an individual user. This reduces the computational resource required by the recommender system markedly. Further improvements are obtained in some embodiments by selecting only relevant concepts from the concept lattice before building a user profile from the selected concepts. Yet further improvements are obtained by the introduction of a relevance measure which depends upon the difference between the size of the extent of the concept whose relevance is being measured and the size of the largest lower neighbour of the concept whose relevance is being measured. This relevance measure can be computed more easily than prior relevance measures.

The invention claimed is:

1. A method of operating a processor-based system to generate recommendations of digital content items for a target user of a digital content item provision system, said method comprising operating said processor-based system to:

generate, for each of a plurality of users of the digital content item provision system, a user profile from a concept lattice representing digital content items selected by the user, the concept lattice comprising one or more formal concepts, each formal concept comprising a data structure including one or more digital content item identifiers and one or more attributes shared by the identified digital content items, the concept lattice being based on a Formal Concept Analysis;
wherein user profile generation comprises:
   a) calculating a relevancy measure for each of the one or more formal concepts in said concept lattice representing digital content items selected by the user; and
   b) selecting relevant formal concepts on the basis of said relevancy measures to use in generating the user profile;
compare said user profiles to identify similar users; and transmit to said target user, recommendations of one or more digital content items based on digital content items selected by similar users to said target user;

wherein the relevancy measure depends upon the number of digital content items found in the formal concept but not in the largest of the one or more formal subconcepts of the formal concept.

2. A method according to claim 1 wherein said calculation of said relevancy measure further comprises dividing said number by the number of digital content items represented in the user profile.

3. A method according to claim 1 further comprising operating said content provision system to pre-emptively deliver some or all of a recommended digital content item to the target user.

4. A method according to claim 1 further comprising operating said processor-based system to:

receive data representing binary relationships between a set of digital content items selected by each user and a set of attributes of those digital content items; and build, for each of said plurality of users, said concept lattice representing the digital content items selected by the user.

5. The method according to claim 1 further comprising operating said processor-based system to:

remove formal concepts of relatively low relevancy, as determined from the relevancy measure, from said concept lattice to generate said user profile.

6. Recommender apparatus comprising a processor-based system arranged in operation to:

generate, for each of a plurality of users of a digital content provision system, a user profile from a concept lattice representing digital content items selected by the user, the concept lattice comprising one or more formal concepts, each formal concept comprising a data structure including one or more digital content item identifiers and one or more attributes shared by the identified digital content items, wherein the user profile generation comprises calculating a relevancy measure for a plurality of formal concepts in said concept lattice, and removing formal concepts of relatively low relevancy from said concept lattice to generate said user profile;

find users in said plurality of users of said digital content system whose user profiles are similar to the user profile of the target user, and to select for recommendation to the target user, digital content items popular with said similar users but not yet provided to the target user; and transmit a recommendation message to said target user recommending one or more of the digital content items selected for the target user;

wherein said relevancy measure depends upon the number of digital content items found in the formal concept but not in the largest of the one or more formal subconcepts of the formal concept.

7. Recommender apparatus according to claim 6 wherein calculating said relevancy measure comprises dividing said number by the number of digital content items represented in the user profile.

8. The recommender apparatus according to claim 6, wherein the processor-based system is further arranged in operation to:

receive data representing binary relationships between a set of digital content items selected by each user and a set of attributes of those digital content items; and build, for each of said plurality of users, said concept lattice representing the digital content items selected by the user.

9. A digital content storage device for consumers of digital content, said digital content storage device being at least arranged to;

receive said recommendation message from recommender apparatus comprising a processor-based system arranged in operation to:

generate, for each of a plurality of users of a digital content provision system, a user profile from a concept lattice representing digital content items selected by the user, the concept lattice comprising one or more formal concepts, each formal concept comprising a data structure including one or more digital content item identifiers and one or more attributes shared by the identified digital content items, where in the user profile generation comprises calculating a relevancy measure for a plurality low relevancy from said concept lattice to generate said user profile;

find users in said plurality of users of said digital content system whose user profiles are similar to the user profile of the target user, and to select for recommendation to the target user, digital content items popular with said similar users but not yet provided to the target user; and transmit a recommendation message to said target user recommending one or more of the digital content items selected for the target user;

wherein said relevancy measure depends upon the number of digital content items found in the formal concept but not in the largest of the one or more formal subconcepts of the formal concept, and download some or all of said recommended content.

10. A non-transitory computer program element comprising computer program code to, when loaded into a computer system and executed thereon, cause the computer system to perform the steps of a method of operating the computer system to generate recommendations of digital content items for a target user of a digital content item provision system, said method comprising operating the computer system to:

generate, for each of a plurality of users of the difital content item provision system, a user profile from a concept lattice representing digital content items selected by the user, the concept lattice comprising one or more formal concepts, each formal concept comprising a data structure including one or more digital content item identifiers and one or more attributes shared by the identified digital content items, the concept lattice being based on a Formal Concept Analysis;

wherein user profile generation comprises:
 (a) calculating a relevency measure for each of the one or more formal concepts in said concept lattice representing digital content items selected by the user; and
 (b) selecting relevant formal concepts on the basis of said relevancy measures to use in generating the user profile;

compare said user profile to identify similar users; and transmit to said target user, recommendations of one or more digital content items based on digital content items selected by similar user to said target user;

wherein the relevancy measure depends upon the number of digital content items found in the formal concept but not in the largest of the one or more formal subconcepts of the formal concept.

11. The non-transitory computer program element according to claim 10 wherein method further comprises operating the computer system to remove formal concepts of relatively low relevancy, as determined from the relevancy measure, from said concept lattice to generate said user profile.

* * * * *